United States Patent
Han

(10) Patent No.: US 12,155,225 B2
(45) Date of Patent: Nov. 26, 2024

(54) WIRELESS CHARGER

(71) Applicants: Hyundai Motor Company, Seoul (KR); Kia Motors Corporation, Seoul (KR)

(72) Inventor: Jang Soon Han, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 378 days.

(21) Appl. No.: 17/108,347

(22) Filed: Dec. 1, 2020

(65) Prior Publication Data

US 2021/0328461 A1 Oct. 21, 2021

(30) Foreign Application Priority Data

Apr. 21, 2020 (KR) .......................... 10-2020-0048250

(51) Int. Cl.
*H02J 50/12* (2016.01)
*H02J 7/00* (2006.01)
*H02J 7/02* (2016.01)

(52) U.S. Cl.
CPC ........ *H02J 50/12* (2016.02); *H02J 7/007192* (2020.01); *H02J 7/02* (2013.01)

(58) Field of Classification Search
CPC .. H02J 50/70; H02J 50/10; H02J 50/12; H02J 7/007192; H04B 5/0075
See application file for complete search history.

(56) References Cited

U.S. PATENT DOCUMENTS

| 7,016,622 | B2 * | 3/2006 | Kinouchi | G03G 15/205 |
| | | | | 399/334 |
| 10,886,790 | B2 * | 1/2021 | Ryu | H02J 50/12 |
| 2016/0118179 | A1 * | 4/2016 | Park | H01F 27/2871 |
| | | | | 320/108 |
| 2017/0141615 | A1 * | 5/2017 | Moon | H02J 50/12 |
| 2018/0076672 | A1 * | 3/2018 | Shichino | H02J 7/007192 |
| 2019/0392984 | A1 * | 12/2019 | Han | H01F 27/2885 |

FOREIGN PATENT DOCUMENTS

| CN | 108539820 A | * | 9/2018 | ............. H02J 5/005 |
| KR | 10-2012-0082769 A | | 7/2012 | |
| KR | 10-2017-0009683 A | | 1/2017 | |
| KR | 10-2019-0143242 A | | 12/2019 | |

* cited by examiner

*Primary Examiner* — Richard Isla
*Assistant Examiner* — Sadia Kousar
(74) *Attorney, Agent, or Firm* — Fox Rothschild LLP

(57) ABSTRACT

A wireless charger, which performs wireless charging in a reception coil and a transmission coil is provided. The wireless charger includes a first filter having a first coil, a first capacitor, a second capacitor, a first switch, and a second switch. Additionally, the wireless charger includes a second filter having a second coil, a third capacitor, a fourth capacitor, a third switch, and a fourth switch. A controller performs a first mode of turning off the second switch and the fourth switch when turning on the first switch and the third switch, and a second mode of turning on the second switch and the fourth switch when turning off the first switch and the third switch.

11 Claims, 10 Drawing Sheets

|  | T1a | T1b | T2a | T2b |
|---|---|---|---|---|
| MODE 1 | ON | OFF | ON | OFF |
| MODE 2 | OFF | ON | OFF | ON |

WIRELESS CHARGER

CROSS-REFERENCE TO RELATED APPLICATION(S)

This application is based on and claims priority under 35 U.S.C. § 119 to Korean Patent Application No. 10-2020-0048250, filed on Apr. 21, 2020, the disclosure of which is incorporated by reference herein in its entirety.

BACKGROUND

1. Field of the Disclosure

The disclosure relates to a wireless charger, and more particularly, to a wireless charger that reduces noise.

2. Description of the Related Art

Technologies for wirelessly transmitting and receiving electric energy are spreading to fields related to charging of smart phones, wearable devices, medical devices, Internet of Things (IoT), and electric vehicles. When wireless power for wireless charging is transmitted, electromagnetic waves other than necessary electromagnetic waves are emitted, which affects other electronic devices, wireless power receivers, or other devices of devices including the wireless power receivers, which are located nearby, and furthermore, other electronic elements and circuits in wireless power transmitters, thus causing potential interference, malfunction, damage to parts, and the like.

Herein, the electromagnetic waves are electromagnetic waves other than a signal to be transmitted, and include electromagnetic interference (EMI) noise, electromagnetic compatibility (EMC) noise, and the like. In particular, for devices sensitive to electromagnetic waves, strict electromagnetic wave strength limits are set for power signals other than the power transmission frequency, and thus to use wireless power transmission devices together with these devices, a wireless charging technology is required for satisfying the electromagnetic wave strength limitation condition.

SUMMARY

An aspect of the disclosure provides a wireless charger capable of reducing noise by using a ring-shaped filter. Another aspect of the disclosure provides a wireless charger capable of changing an operating mode of a filter based on a temperature of the coil. Additional aspects of the disclosure will be set forth in part in the description which follows and, in part, will be obvious from the description, or may be learned by practice of the disclosure.

In accordance with an aspect of the disclosure, a wireless charger may include a power source, a transmission coil configured to generate an electromagnetic field when power is supplied from the power source to generate an electromagnetic induction phenomenon between a reception coil provided in an object requiring power and the transmission coil, and a filter unit disposed on one side of the transmission coil to be disposed between the transmission coil and the reception coil and including at least one coil and at least one capacitor for eliminating noise generated between the transmission coil and the reception coil.

The wireless charger may further include a main body having a seating portion on which the object requiring power is seated. The transmission coil may be provided inside the main body, and the filter unit may be provided inside the main body and may be disposed between the seating portion and the transmission coil. The at least one coil may include a first coil and a second coil, and the at least one capacitor may include a first capacitor connected to both ends of the first coil and a second capacitor connected to both ends of the second coil.

The at least one capacitor may include a first capacitor connected to a first end and an intermediate point of the coil, and a second capacitor connected to a first end of the coil and a second end of the coil. The filter unit may include a first filter having a first coil, a first capacitor connected to a first end and a second end of the first coil, and a second capacitor connected to an intermediate point of the first coil and the second end of the first coil, and a second filter having a second coil, a third capacitor connected to a first end of the second coil and an intermediate point of the second coil, and a fourth capacitor connected to the first end of the second coil and a second end of the second coil.

The first filter may further include a first switch disposed between the first capacitor and the second end of the first coil, and a second switch disposed between the second capacitor and the second end of the first coil, and one of the first switch and the second switch may be turned on. Additionally, the first filter may further include a first temperature detector disposed between the first end of the first coil and the first capacitor to detect a temperature of the first coil, and a second temperature detector disposed between the second capacitor and the second switch to detect the temperature of the first coil. The wireless charger may further include a controller configured to, at turn-on control of the first switch and turn-off control of the second switch, turn off the first switch and turn on the second switch, when the temperature of the first coil detected by the first temperature detector is greater than or equal to a reference temperature.

The controller may be configured to, at turn-off control of the first switch and turn-on control of the second switch, turn on the first switch and turn off the second switch, when the temperature of the first coil detected by the second temperature detector is greater than or equal to the reference temperature. The second filter may further include a third switch disposed between the first end of the second coil and the third capacitor, and a fourth switch disposed between the first end of the second coil and the fourth capacitor, and allow one of the third switch and the fourth switch to be turned on.

The second filter may further include a third temperature detector disposed between the third capacitor and the third switch to detect a temperature of the second coil, and a fourth temperature detector disposed between the fourth capacitor and the second end of the second coil to detect the temperature of the second coil. The wireless charger may further include a controller configured to, at turn-on control of the third switch and turn-off control of the fourth switch, turn off the third switch and turn on the fourth switch, when the temperature of the second coil detected by the third temperature detector is greater than or equal to a reference temperature. The controller may be configured to, at turn-off control of the third switch and turn-on control of the fourth switch, turn on the third switch and turn off the fourth switch, when the temperature of the second coil detected by the fourth temperature detector is greater than or equal to the reference temperature.

The first filter may further include a first switch disposed between the first capacitor and the second end of the first coil, and a second switch disposed between the second capacitor and the second end of the first coil, the second filter may further include a third switch disposed between the first end of the second coil and the third capacitor, and a fourth switch disposed between the first end of the second coil and the fourth capacitor. The wireless charger may further include a controller configured to perform a first mode of turning off the second switch and the fourth switch when turning on the first switch and the third switch, and a second mode of turning on the second switch and the fourth switch when turning off the first switch and the third switch.

The first filter may further include a first temperature detector disposed between the first end of the first coil and the first capacitor to detect a temperature of the first coil, and a second temperature detector disposed between the second capacitor and the second switch to detect the temperature of the first coil. The second filter may further include a third temperature detector disposed between the third capacitor and the third switch to detect a temperature of the second coil, and a fourth temperature detector disposed between the fourth capacitor and the second end of the second coil to detect the temperature of the second coil. The controller may be configured to control switching between the first mode and the second mode based on at least one of the temperature of the first coil and the temperature of the second coil.

In accordance with another aspect of the disclosure, a wireless charger, which performs wireless charging in a reception coil and a transmission coil, may include a first filter including a first coil, a first capacitor connected to a first end of the first coil and a second end of the first coil, a second capacitor connected to an intermediate point of the first coil and the second end of the first coil, a first switch disposed between the first capacitor and the second end of the first coil, and a second switch disposed between the second capacitor and the second end of the first coil, a second filter including a second coil, a third capacitor connected to a first end of the second coil and an intermediate point of the second coil, a fourth capacitor connected to the first end of the second coil and a second end of the second coil, a third switch disposed between the first end of the second coil and the third capacitor, and a fourth switch disposed between the first end of the second coil and the fourth capacitor, and a controller configured to perform a first mode of turning off the second switch and the fourth switch when turning on the first switch and the third switch, and a second mode of turning on the second switch and the fourth switch when turning off the first switch and the third switch.

The first filter may further include a first temperature detector disposed between the first end of the first coil and the first capacitor to detect a temperature of the first coil, and a second temperature detector disposed between the second capacitor and the second switch to detect the temperature of the first coil. The second filter may further include a third temperature detector disposed between the third capacitor and the third switch to detect a temperature of the second coil, and a fourth temperature detector disposed between the fourth capacitor and the second end of the second coil to detect the temperature of the second coil. The controller may be configured to control switching between the first mode and the second mode based on at least one of the temperature of the first coil and the temperature of the second coil.

The controller may be configured to, when performing the first mode, switch to the second mode when the temperature of the first coil detected by the first temperature detector is greater than or equal to a reference temperature or when the temperature of the second coil detected by the third temperature detector is greater than or equal to the reference temperature, and configured to, when performing the second mode, switch to the second mode when the temperature of the first coil detected by the second temperature detector is greater than or equal to the reference temperature or when the temperature of the second coil detected by the fourth temperature detector is greater than or equal to the reference temperature. The controller may be configured to control switching between the first mode and the second mode at a preset time interval.

In accordance with another aspect of the disclosure, a wireless charger, which performs wireless charging in a reception coil and a transmission coil, may include a first filter including a first coil, a first capacitor connected to both ends of the first coil, a second filter including a second coil, a second capacitor connected to both ends of the second coil, and a controller configured to selectively control supply of current to the first filter and the second filter.

The wireless charger may further include a first temperature detector configured to detect a temperature of the first coil, and a second temperature detector configured to detect a temperature of the second coil. The controller may be configured to adjust a current flowing through at least one of the first filter and the second filter based on one of the temperature of the first coil and the temperature of the second coil. Additionally, the controller may be configured to adjust a current flowing through at least one of the first filter and the second filter at a preset time interval.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIG. 11 is a mode exemplary table of the wireless charger according to another exemplary embodiment.

DETAILED DESCRIPTION

Figure 1:
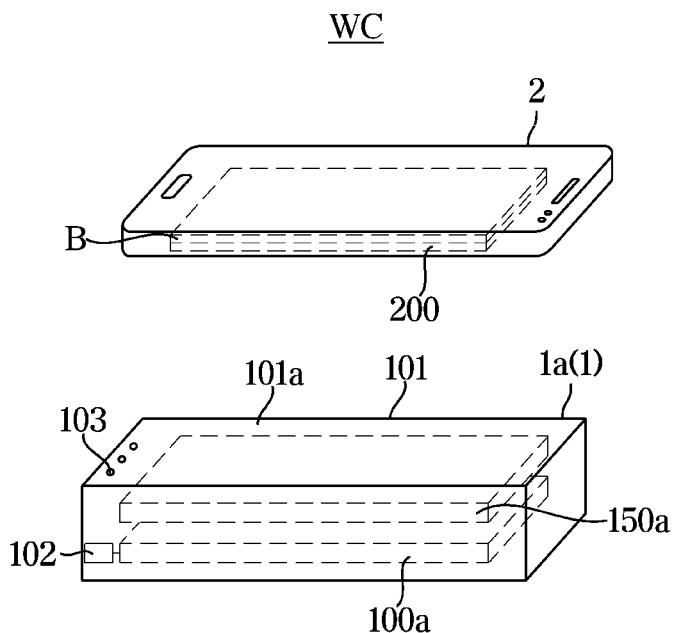
FIG. 1 is an exemplary view of a wireless charger according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. This specification does not describe all the elements of the exemplary embodiments, and duplicative contents between general contents or exemplary embodiments in the technical field of the disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being "connected" to another part, it includes not only a direct connection but also an indirect connection, and the indirect connection includes connecting through a wireless network. Also, when it is described that a part "includes" an element, it means that the element may further include other elements, not excluding the other elements unless specifically stated otherwise. The terms 'first,' 'second,' etc. are used to distinguish one element from another element, and the elements are not limited by the above-mentioned terms. In each step, an identification numeral is used for convenience of explanation, the identification numeral does not describe the order of the steps, and each step may be performed differently from the order specified unless the context clearly states a particular order.

Hereinafter the disclosure will be described in detail with reference to the accompanying drawings. A wireless charger (WC) is a device configured to wirelessly supply power to an object or device that requires power. The object or device requiring power may be a device that requires driving power to operate a load or a device that requires charging power to charge a battery. A device that requires charging power to charge a battery may include a terminal 2, a vehicle 3, or a smart key of a vehicle. A wireless charger may be configured to wirelessly supply power through at least one of a magnetic induction method, a magnetic resonance method, or a microwave method. The present exemplary embodiment will describe a magnetic induction type wireless charger.

Figure 2:
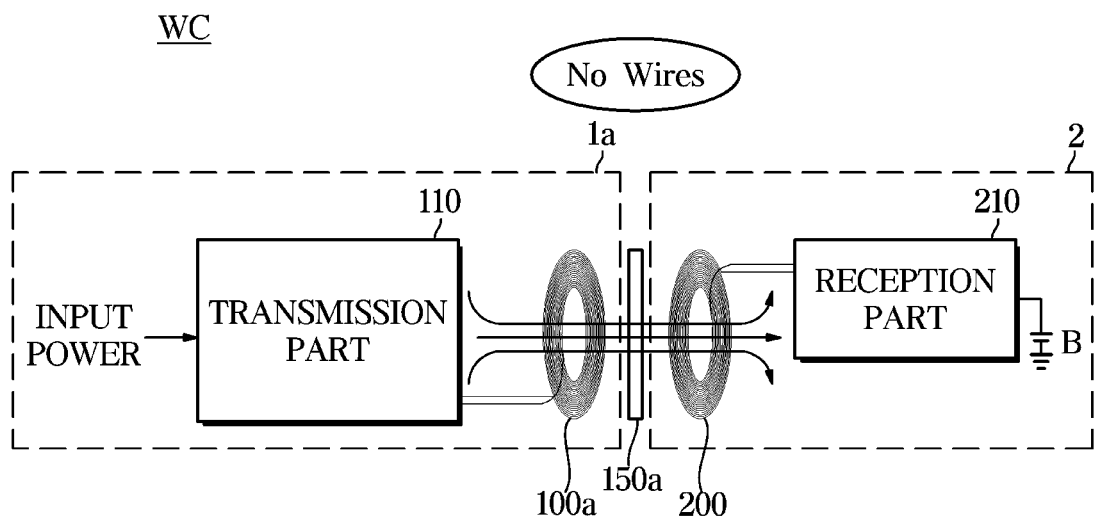
FIG. 2 is an exemplary diagram of a wireless charging principle of the wireless charger according to an exemplary embodiment.

FIG. 1 is an exemplary view of a wireless charger according to an exemplary embodiment, and FIG. 2 is an exemplary diagram of a wireless charging principle of the wireless charger according to an exemplary embodiment. The wireless charger, which is a device to supply energy to a desired load or charge a battery by generating an induced current in two adjacent coils, may include a power transmitter 1a configured to generate high-power and high-frequency signals required for power transmission and transmit the generated high-power and high-frequency signals, and a power receiver 2 configured to rectify a received high-frequency power to supply energy to a desired load.

In an exemplary embodiment, the power receiver may be a terminal 2. The terminal 2 may be implemented as a computer or a portable terminal that may access a vehicle via a network. The computer may include, for example, a notebook, a tablet PC, a slate PC, and the like with a web browser (WEB Browser), and the portable terminal, which is a wireless communication device with guaranteed portability and mobility, may include all types of handheld based wireless communication devices such as a PCS (Personal Communication System), a GSM (Global System for Mobile communication), a PDC (Personal Digital Cellular), a PHS (Personal Handyphone System), a PDA (Personal Digital Assistant), an IMT (International Mobile Telecommunication)—2000, a CDMA (Code Division Multiple Access)—2000, an W-CDMA (W-Code Division Multiple Access), an WiBro (Wireless Broadband Internet) terminal, and a smart phone, and wearable devices such as a watch, a ring, a bracelet, an anklet, a necklace, a pair of glasses, a contact lens, and a head-mounted device (HMD).

The power transmitter 1a may include a main body 101 provided with a seating portion 101a on which the terminal 2 is seated. The seating portion 101a of the main body 101 may be formed in a circular or polygonal shape. The power transmitter 1a may include a transmission coil 100a configured to generate an electromagnetic field when the terminal 2 is seated on the seating portion 101a to charge the terminal 2 by an electromagnetic induction phenomenon between the power transmitter 1a and the terminal 2.

When an accommodation space is provided in the main body 101, the transmission coil 100a may be disposed inside the main body 101. The transmission coil 100a may include one or a plurality of coils. When the main body 101 has a pad shape, the transmission coil 100a may be disposed below the seating portion 101a of the main body 101. The transmission coil 100a may be configured to an electromagnetic field when a current flows. In other words, when power is supplied from a power source 102, a current flows in the transmission coil 100a and generates an electromagnetic field. The power source 102 may be a commercial power source or a battery.

The power transmitter 1a may be configured to execute the operation of the power source 102 based on a transmission power requested from the terminal 2. In particular, the power transmitter 1a may be configured execute the operation of the power source 102 to check a current corresponding to the transmission power requested from the terminal 2 and to generate the checked current. The power source 102 may configured to supply power to the transmission coil 100a and supply power capable of generating the transmission power requested from the terminal 2.

The power transmitter 1a may be configured to communicate with the terminal 2. In particular, the power transmitter 1a may be configured to radiate an alternating voltage modulated by a transmitter into the atmosphere as an electromagnetic wave when transmitting a signal to the terminal 2, and may operate as an antenna-type communication module that converts an electromagnetic wave into an alternating voltage evaluated by a receiver when receiving a signal from the terminal 2. The power transmitter 1a may be configured to check a signal electric field strength of the received signal when communicating with the terminal 2 and detect a change in the position of the terminal 2 seated on the main body 101 based on the checked signal electric field strength.

The power transmitter 1a may be configured to request the terminal 2 to provide charging efficiency, compare the received charging efficiency with a reference charging efficiency when the charging efficiency is received from the terminal 2, output information on a seating failure of the terminal 2 in response to determining that the received charging efficiency is less than the reference charging efficiency, and output information on a seating success of the terminal 2 when the received charging efficiency is greater than or equal to the reference charging efficiency. The power transmitter 1a may further include at least one of a display 103 or a sound output (not shown) and may be configured to output information on the seating failure and seating success of the terminal 2 through the display 103 or the sound output.

The terminal 2 may include a battery B and a reception coil 200 to supply power to the battery B to charge the battery B. The reception coil 200 may be configured to receive an electromagnetic field, generate a current by the received electromagnetic field, and supply the generated current to the battery B. The terminal 2 may further include a current detector (not shown) configured to detect a current generated in the reception coil 200. The terminal 2 may be configured to obtain a charge amount of the battery B based on information on the current detected by the current detector.

The terminal 2 may be configured to check a transmission power requested from the power transmitter 1a in response to receiving a charging efficiency request command from the power transmitter 1a, determine a reception power based on the current detected by the current detector for a predetermined time, determine a charging efficiency by comparing the transmission power and the reception power, and transmit the determined charging efficiency to the power transmitter 1a. The transmission coil 100a and the reception coil 200 may include conductive wires. When the type of transmission energy is a magnetic field, a solenoid type or helical type coil may be used as the transmission coil 100a and the reception coil 200.

Hereinafter, an operation principle of the wireless charger will be described with reference to FIG. 2. The wireless charger (WC) may be configured to transmit and receive power using the transmission coil 100a of the power transmitter 1a and the reception coil 200 of the terminal 2. First, the power transmitter 1a may be configured to generate a high power/high frequency signal required for transmission using a transmission part 110 in response to receiving the input power, and transmit the generated high power/high frequency signal to the transmission coil 100a.

When the high power/high frequency signal generated from the transmission part 110 of the power transmitter 1a is received by the transmission coil 100a, a magnetic field may be generated, and the magnetic field generated by the transmission coil 100a generates an induced current while passing through the reception coil 200 of the terminal 2. The generated induced current may be rectified through the reception part 210 of the terminal 2, converted to direct current (DC), and then supplied to the battery B as charging energy. The wireless charger may further include a filter unit 150a configured to eliminate EMC noise caused by a fringing magnetic field generated between the transmission coil 100a and the reception coil 200 when energy is transmitted from the transmission coil 100a to the reception coil 200.

Figure 3:
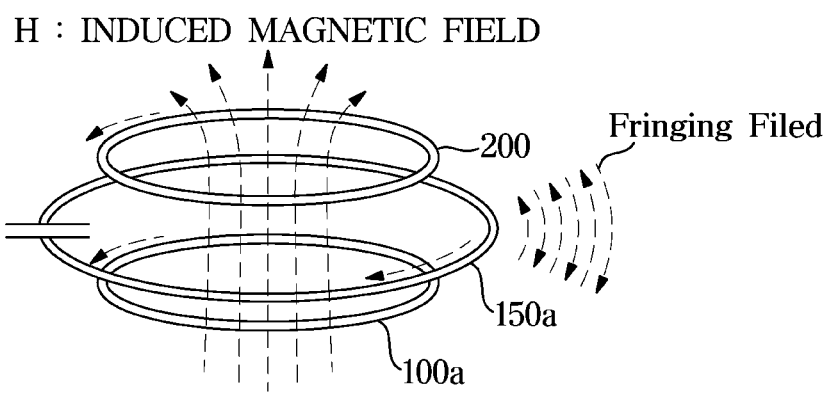
FIG. 3 is an arrangement exemplary view of a filter unit of the wireless charger according to an exemplary embodiment.

As illustrated in FIGS. 2 and 3, the filter unit 150a may be disposed between the transmission coil 100a and the reception coil 200. The filter unit 150a may be provided in the power transmitter 1a or the terminal 2. The filter unit 150a may be provided as a separate device from the power transmitter 1a and the terminal 2. In the present exemplary embodiment, the filter unit 150a provided in the power transmitter 1a will be described.

When an accommodation space is provided in the main body 101, the filter unit 150a may be disposed inside the main body 101 of the wireless transmission device 1a, and may be disposed between the transmission coil 100a and the seating portion 101a. When the main body 101 has a pad shape, the filter unit 150a may be disposed below the seating portion 101a, and may be disposed between the transmission coil 100a and the seating portion 101a.

Figure 4A:
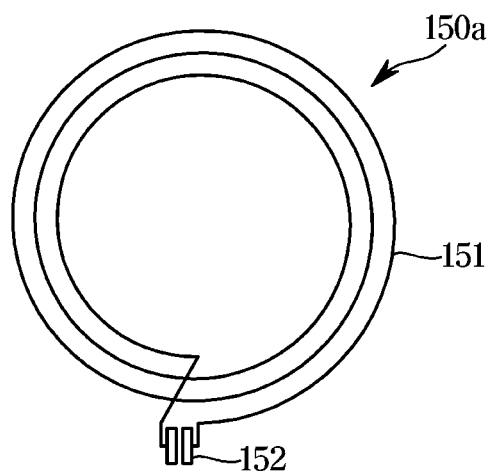
FIG. 4A is an exemplary view of the filter unit of the wireless charger according to an exemplary embodiment.
Figure 4B:
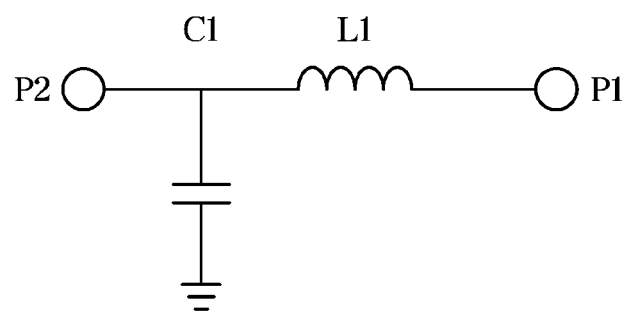
FIG. 4B is a circuit diagram of the filter unit illustrated in FIG. 4A.

As illustrated in FIG. 4A, the filter unit 150a may include a coil 151 formed in a closed loop, and a capacitor 152 connected to both ends (e.g., start point and end point or a first end and a second end) of the coil 151. The filter unit 150a may have a ring shape. As illustrated in FIG. 4B, the coil 151 (L1) of the filter unit 150a may be disposed between power terminals P1 and P2, and the capacitor 152 (C1) may be disposed between a contact point between the coil 151 and the power terminal P2 and a ground. An inductance of the coil 151 (L1) may be about 100 uH/430 mA/1.59 ohm or 1 uH/220 mA/0.05 ohm, and a capacitance of the capacitor 152 (C1) may be about 0.01 uF. An inductance range of the coil 151 (L1) may be about 1 uH to 100 uH. The number of turns of the coil 151 may vary according to the specifications (e.g., charging voltage, etc.) of the wireless charger (WC). The coil 151 is surrounded by an insulator (sheath) like an electric wire and may be implemented in various shapes such as a circle, an ellipse, and a polygon.

As illustrated in FIG. 3, the closed loop type coil 151 generates a magnetic field of an inverse phase (e.g., a phase having a difference of 180 degrees) to prevent a leakage magnetic field generated from the transmission coil 100a of the power transmitter 1a, and this inverse phase may cancel out the leakage magnetic field generated by the transmission coil 100a (e.g., shield the leakage magnetic field). The leakage magnetic field may be generated around a transmission coil when current flows through a coil for wireless power transmission and adversely affects a user's human body or peripheral electronic devices. In addition, cancellation or prevention of the leakage magnetic field ultimately means reduction of electromagnetic waves.

Figure 4C:
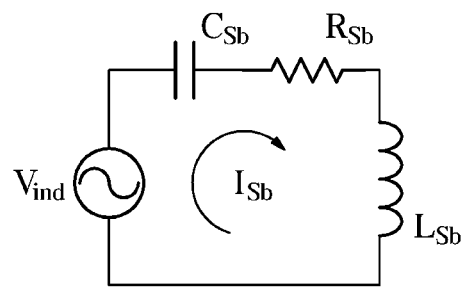
FIG. 4C is an equivalent circuit diagram of the filter unit illustrated in FIG. 4A.

As illustrated in FIG. 4C that is an equivalent circuit diagram of the filter unit, the capacitor 152 connected to both ends of the closed loop adjusts (controls) the phase and magnitude of the current induced in the closed loop by adjusting a resonance frequency (e.g., resonance point) of the closed loop, so that the capacitor 152 may completely cancel the leakage magnetic field by generating an inverse phase magnetic field having the same magnitude as the leakage magnetic field. In particular, unlike a method of shielding a leakage magnetic field using ferrite or a metal shield, a relatively small size and small weight may be realized since a capacitor is used to shield the leakage magnetic field.

Figure 5:
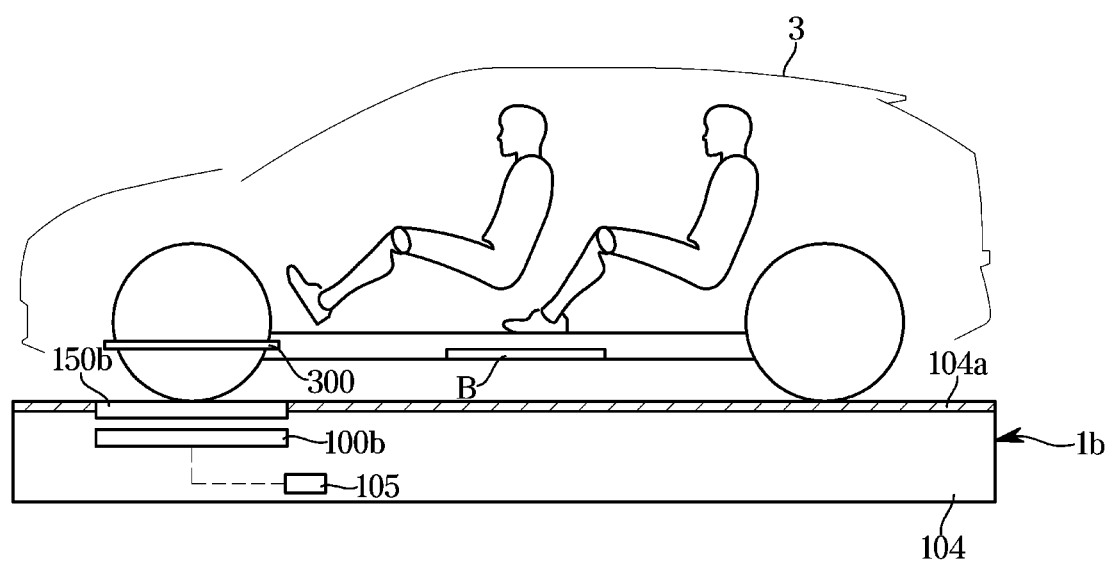
FIG. 5 is an exemplary view of a wireless charger according to another exemplary embodiment.

FIG. 5 is an exemplary view of a wireless charger according to another exemplary embodiment. In another exemplary embodiment, the power receiver may be the vehicle 3. A power transmitter 1*b* may include a main body 104 provided with a seating portion 104*a* on which the vehicle 3 is seated after stopping. The power transmitter 1*b* may include a transmission coil 100*b* configured to generate an electromagnetic field by applying a current when the vehicle 3 is located on the seating portion 104*a*.

When an accommodation space is provided in the main body 104, the transmission coil 100*b* may be disposed inside the main body 104. The transmission coil 100*b* may include one or a plurality of coils. When power is supplied from a power source 105, a current flows in the transmission coil 100*b* and generates an electromagnetic field. The power source 105 may be a commercial power source. The power transmitter 1*b* may be configured to execute the operation of the power source 105 based on a transmission power requested from the vehicle 3. In particular, the power transmitter 1*b* may be configured to execute the operation of the power source 105 to check a current corresponding to the transmission power requested from the vehicle 3 and to generate the checked current.

The power source 105 may be configured to supply power to the transmission coil 100*b* and supply power capable of generating the transmission power requested from the vehicle 3. The power transmitter 1*b* may be configured to communicate with the vehicle 3. The power transmitter 1*b* may be configured to check a signal electric field strength of a received signal when communicating with the vehicle 3 and detect a change in the position of the vehicle 3 seated on the main body 104 based on the checked signal electric field strength.

The vehicle 3 may include the battery B and a reception coil 300 to supply power to the battery B to charge the battery B. The reception coil 300 may be configured to receive an electromagnetic field, generate a current by the received electromagnetic field, and supply the generated current to the battery B. The vehicle 3 may further include a current detector (not shown) configured to detect a current generated in the reception coil 300. The vehicle 3 may be configured to obtain a charge amount of the battery B based on information on the current detected by the current detector.

The transmission coil 100*b* and the reception coil 300 may include conductive wires. When the type of transmission energy is a magnetic field, a solenoid type or helical type coil may be used as the transmission coil 100*b* and the reception coil 300. An operating principle of the wireless charger WC according to the present exemplary embodiment is the same as in the above-described exemplary embodiment, and thus a description thereof will be omitted. The wireless charger WC may further include a filter unit 150*b* to eliminate EMC noise caused by a fringing magnetic field generated between the transmission coil 100*b* and the reception coil 300 when energy is transmitted from the transmission coil 100*b* to the reception coil 300.

As illustrated in FIG. 5, the filter unit 150*b* may be disposed between the transmission coil 100*b* and the reception coil 300. The filter unit 150*b* may be provided in the power transmitter 1*b* or the vehicle 3. The filter unit 150*b* may be provided separately from the power transmitter 1*b*, and may also be provided as a separate device from the vehicle 3. In the present embodiment, the filter unit 150*b* provided in the power transmitter 1*b* will be described.

When an accommodation space is provided in the main body 104, the filter unit 150*b* may be disposed inside the main body 104 of the wireless transmission device 1*b*, and may be disposed above the transmission coil 100*b*. When an accommodation space is provided in the main body 104, the filter unit 150*b* may be disposed inside the main body 104 of the wireless transmission device 1*b*, and may be disposed between the transmission coil 100*b* and the seating portion 104*a*.

Figure 6A:
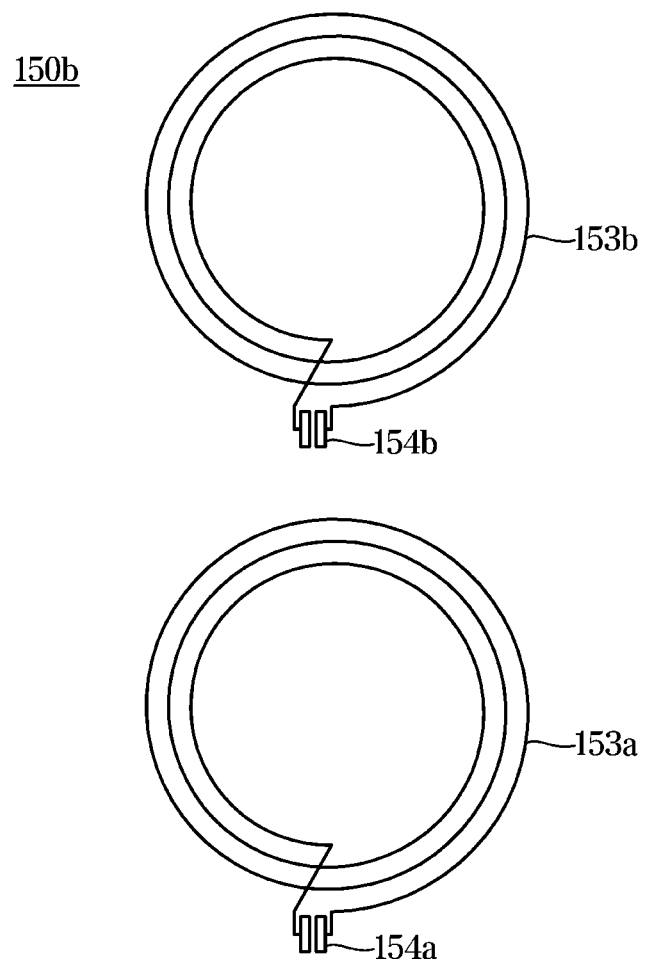
FIG. 6A is an exemplary view of a filter unit of the wireless charger according to another exemplary embodiment.
Figure 6B:
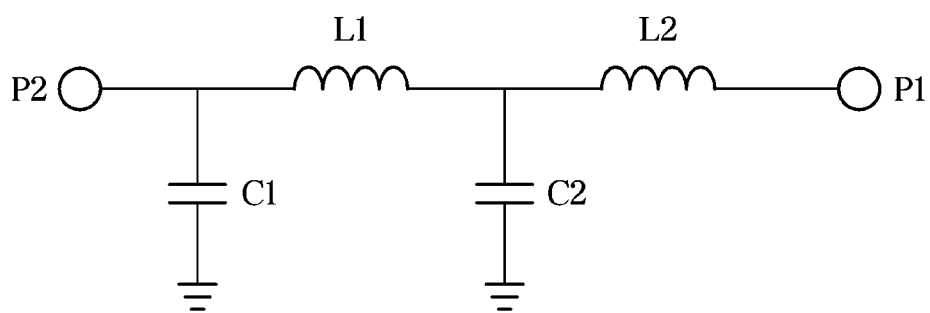
FIG. 6B is a circuit diagram of the filter unit illustrated in FIG. 6A.

As illustrated in FIG. 6A, the filter unit 150*b* may include a first filter having a first coil 153*a* formed in a closed loop and a first capacitor 154*a* connected to both ends (e.g., start point and end point or a first and second end) of the first coil 153*a*, and a second filter having a second coil 153*b* formed in a closed loop and a second capacitor 154*b* connected to both ends (e.g., start point and end point or a first and second end) of the second coil 153*b*. As illustrated in FIG. 6B, the first coil 153*a* (L1) and the second coil 153*b* (L2) of the filter unit 150*b* may be disposed between the power terminals P1 and P2, and the first capacitor 154*a* (C1) may be disposed between a contact point between the first coil 153*a* and the second power terminal P2 and a ground, and the second capacitor 154*b* (C2) may be disposed between a contact point between the first and second coils L1 and L2 and the ground.

An inductance of the first coil L1 may be about 100 uH/1300 mA/0.15 ohm, and a capacitance of the first capacitor C1 may be about 0.01 uF. An inductance of the second coil L2 may be about 0.24 uH/4000 mA/0.016 ohm, and a capacitance of the second capacitor C2 may be about 0.01 uF.

The first and second coils L1 and L2 are surrounded by an insulator (sheath) like an electric wire and may be implemented in various shapes such as a circle, an ellipse, and a polygon. The first and second coils L1 and L2 generate a magnetic field of an inverse phase (e.g., a phase having a difference of 180 degrees) to cancel or prevent a leakage magnetic field generated from the transmission coil 100*b* of the power transmitter 1*b*, and this inverse phase may cancel out or prevent the leakage magnetic field generated by the transmission coil 100*b* (that is, shield the leakage magnetic field).

The first and second capacitors C1 and C2 connected to both ends of the closed loop may be configured to adjust (control) the phase and magnitude of the current induced in the closed loop by adjusting a resonance frequency (resonance point) of the closed loop, so that the first and second capacitors C1 and C2 may completely cancel the leakage magnetic field by generating an inverse phase magnetic field having the same magnitude as the leakage magnetic field. The first filter and the second filter of the filter unit 150*b* may have the same structure (e.g., size, shape, thickness, etc.). When a winding direction of the first coil and the second coil of the filter unit 150b is the same as a winding direction of the transmission coil and the reception coil, even-order signals (even mode) of harmonics may be attenuated, and when the winding directions are different from each other, odd-order signals (add mode) of harmonics may be attenuated.

Figure 7:
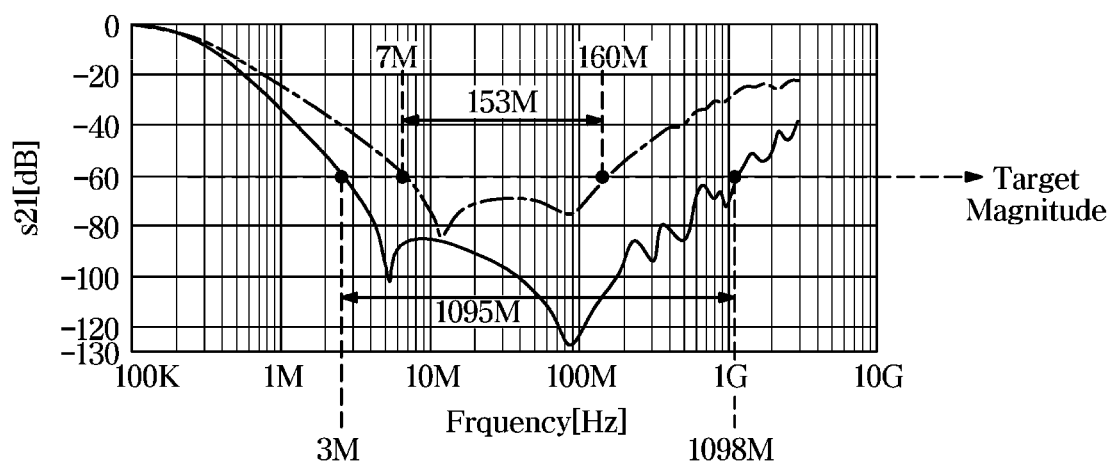
FIG. 7 is a graph illustrating a noise reduction effect of the wireless charger according to another exemplary embodiment.

As illustrated in FIG. 7, the filter unit 150b may be configured to reduce noise in a high frequency band between 3 MHz and 1 GHz by being provided in a dual band method capable of covering a wide bandwidth. The filter unit 150b may be configured to selectively control current supply to the first filter and the second filter. The filter unit 150b may further include a first temperature detector configured to detect a temperature of the first coil and a second temperature detector configured to detect a temperature of the second coil, and may further include a controller configured to adjust a current flowing through at least one of the first filter and the second filter based on the temperature of the first coil and the temperature of the second coil. The filter unit 150b may be configured to adjust current flowing through at least one of the first filter and the second filter at a preset time interval.

Figure 8A:
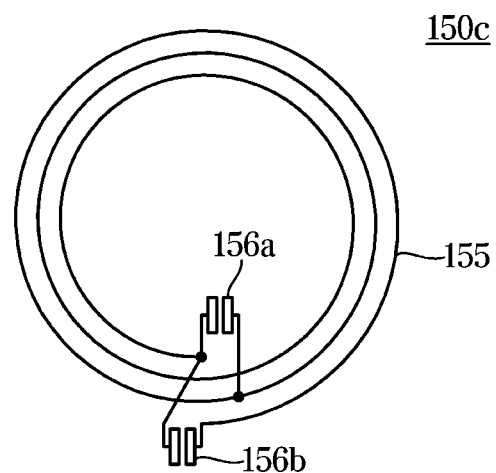
FIG. 8A is an exemplary view of a filter unit of a wireless charger according to another exemplary embodiment.
Figure 8B:
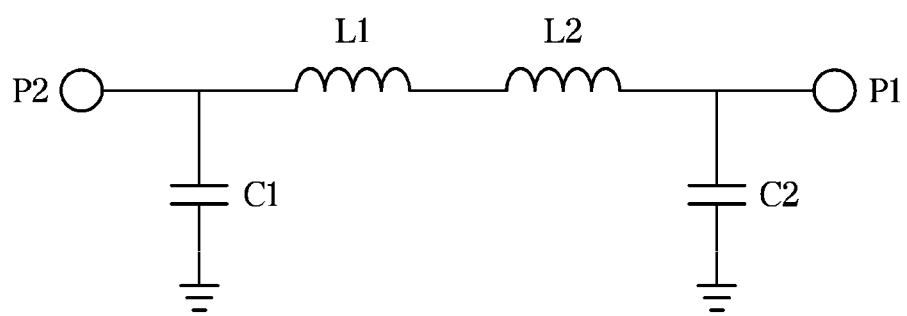
FIG. 8B is a circuit diagram of the filter unit illustrated in FIG. 8A.

FIGS. 8A and 8B are exemplary views of a wireless charger according to another exemplary embodiment. In another exemplary embodiment, the power receiver may be the vehicle 3. The wireless charger WC according to another exemplary embodiment may include a filter unit 150c having a dual cap, unlike the wireless charger of the exemplary embodiment illustrated in FIG. 5. The configurations of the transmission coil and the reception coil other than the configuration of the filter unit 150c having a dual cap according to another exemplary embodiment are the same as those in the above-described exemplary embodiments, and thus a description thereof will be omitted.

As illustrated in FIG. 8A, the filter unit 150c may include a coil 155 formed in a closed loop, a first capacitor 156a connected to an end (e.g., start point or a first end) of the coil 155 and an intermediate point of the coil 155, and a second capacitor 156b connected to both ends (e.g., start point and end point) of the coil 155. As illustrated in FIG. 8B, the coil 155 of the filter unit 150c may be separated into two circuit by the first capacitor connected in the intermediate point of the coil 155. The coil 155 may be divided into the first coil L1 and the second coil L2.

The first coil L1 and the second coil L2 may be provided in series between the power terminals P1 and P2, the first capacitor 156a (C1) may be disposed between a contact point between the first coil L1 and the second power terminal P2 and a ground, and the second capacitor 156b (C2) may be disposed between a contact point between the second coil L2 and the first power terminal P1 and the ground. An inductance of the first coil L1 may be about 100 uH/1200 mA/0.16 hm, and an inductance of the second coil L2 may be about 0.24 uH/4000 mA/0.016 hm. A capacitance of the first capacitor C1 may be about 2.2 uF, and a capacitance of the second capacitor C2 may be about 0.0047 uF.

The first and second coils L1 and L2 are surrounded by an insulator like an electric wire and may be implemented in various shapes such as a circle, an ellipse, and a polygon. The first and second coils L1 and L2 generate a magnetic field of an inverse phase (e.g., a phase having a difference of 180 degrees) to cancel or prevent a leakage magnetic field generated from the transmission coil 100b of the power transmitter 1b, and this inverse phase may cancel out or prevent the leakage magnetic field generated by the transmission coil 100b (e.g., shield the leakage magnetic field). The first and second capacitors C1 and C2 connected to both ends of the closed loop may be configured to adjust (control) the phase and magnitude of the current induced in the closed loop by adjusting a resonance frequency (e.g., resonance point) of the closed loop, so that the first and second capacitors C1 and C2 may completely cancel or prevent the leakage magnetic field by generating an inverse phase magnetic field having the same magnitude as the leakage magnetic field.

Figure 9:
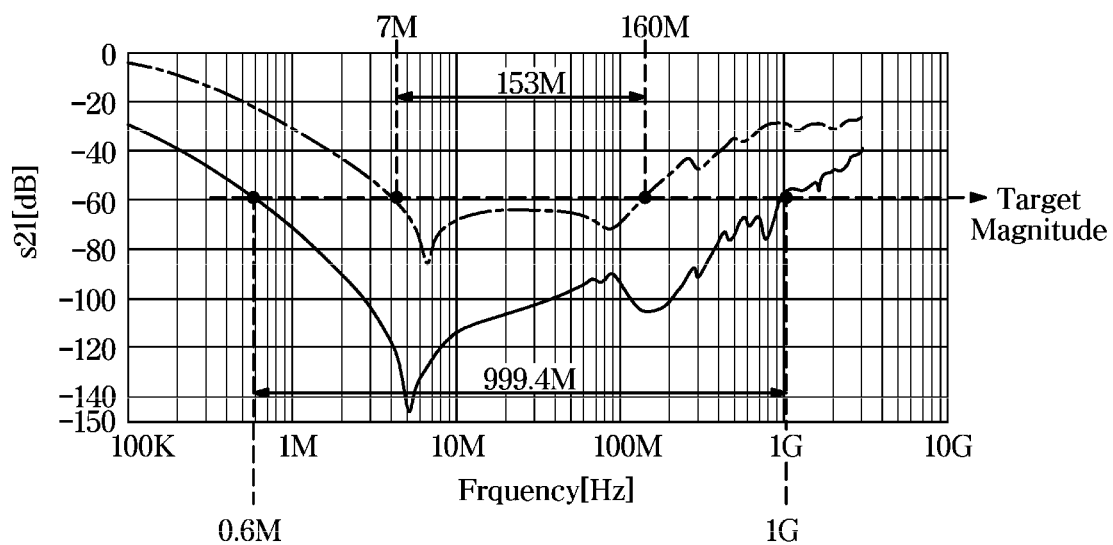
FIG. 9 is a graph illustrating a noise reduction effect of the wireless charger according to another exemplary embodiment.
Figure 10:
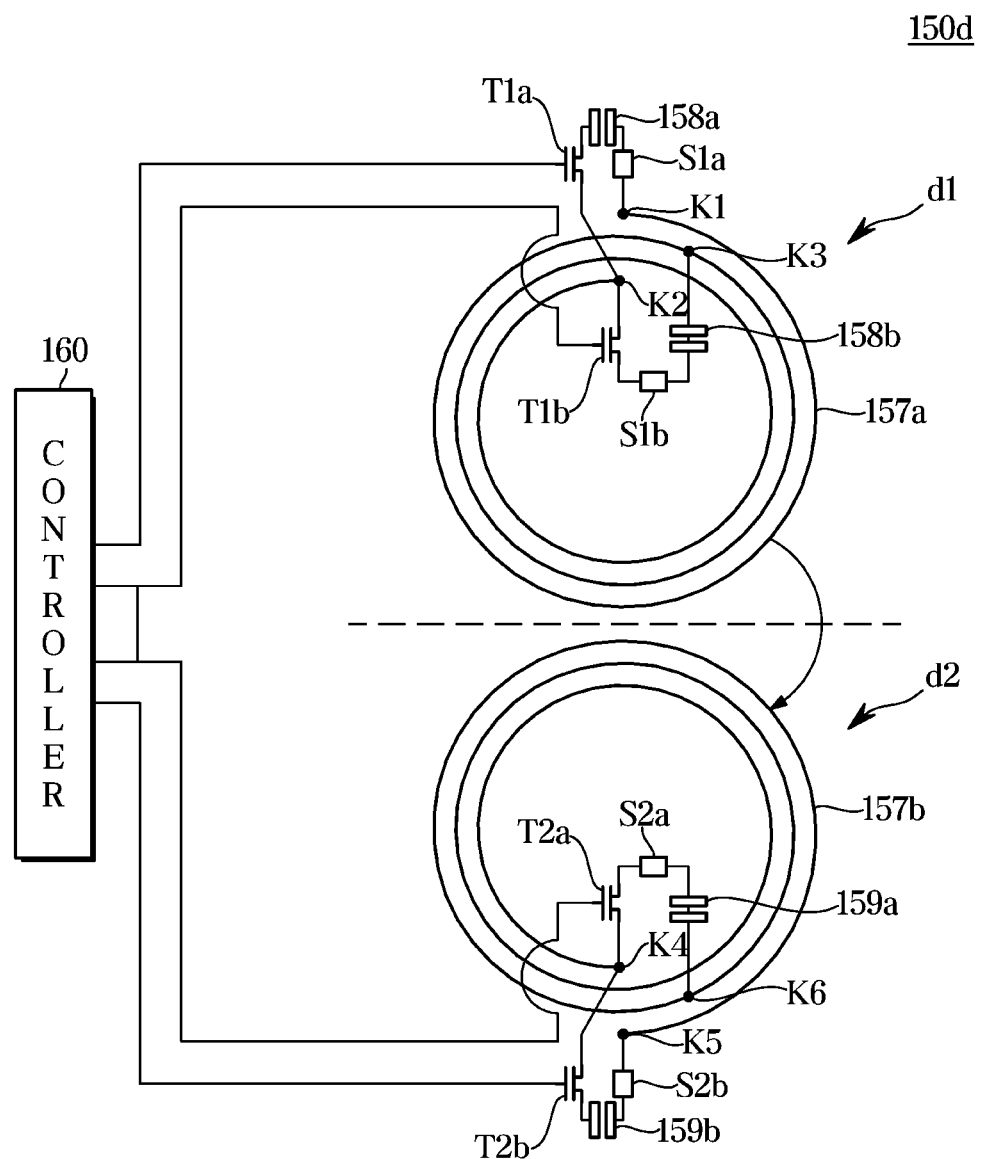
FIG. 10 is a configuration diagram of a wireless charger according to another exemplary embodiment.

As illustrated in FIG. 9, the filter unit 150c may be configured to reduce noise in a high frequency band between 0.6 MHz and 1 GHz by being provided in a dual band method capable of covering a wide bandwidth. FIG. 10 is a configuration diagram of a wireless charger according to another exemplary embodiment. A wireless charger according to another exemplary embodiment illustrated in FIG. 10 may include a filter unit 150d (e.g., first and second filters d1 and d2) having two dual caps, unlike the wireless charger illustrated in FIG. 8A. The wireless charger according to another exemplary embodiment illustrated in FIG. 10 may further include a plurality of temperature detectors, a plurality of switches, and a controller 160.

The filter unit 150d may include the first filter d2 having a first coil 157a formed in a closed loop, a first capacitor 158a connected to both ends (e.g., start point K1 and end point K2) of the first coil 157a, and a second capacitor 158b connected to an intermediate point K3 and the other end (e.g., end point K2 or second end) of the first coil 157a. The intermediate point K3 may be any one point between the start point K1 (e.g., first end) and the end point K2 (e.g., second end) of the first coil 157a. The first filter d1 may include a first temperature detector S1a disposed between the first capacitor 158a and the first end (start point K1) of the first coil 157a, and a first switch T1a disposed between the first capacitor 158a and the controller 160.

For example, the first switch T1a may be a transistor. In particular, a base end of the first switch T1a may be connected to the controller 160, a collector end thereof may be connected to the first capacitor, and an emitter end thereof may be connected to the second end (end point K2) of the first coil 157a. The first filter d1 may include a second switch T1b disposed between the second end K2 of the first coil 157a and the controller 160, and a second temperature detector S1b disposed between the second switch T1b and the second capacitor 158b. For example, the second switch T1b may be a transistor. In particular, a base end of the second switch T1b may be connected to the controller 160, an emitter end thereof may be connected to the second end K2 of the first coil 157a, and a collector end thereof may be connected to the second temperature detector S1b.

The filter unit 150d may include the second filter d2 having a second coil 157b formed in a closed loop, a third capacitor 159a connected to a first end (e.g., start point K4) of the second coil 157b and an intermediate point K6 of the second coil 157b, and a fourth capacitor 159b connected to both ends (e.g., start point K4 and end point K5 or a first end and a second) of the second coil 157b. The second filter d2 may include a third switch T2a disposed between the first end (start point K4) of the second coil 157b and the controller 160, and a third temperature detector S2a disposed between the third switch T2a and the third capacitor 159a. For example, the third switch T2a may be a transistor. In particular, a base end of the third switch T2a may be connected to the controller 160, an emitter end thereof may be connected to the first end K4 of the second coil 157b, and a collector end thereof may be connected to the third temperature detector S2a.

The second filter d2 may include a fourth temperature detector S2b disposed between the fourth capacitor 159b and the second end K5 of the second coil 157b, and a fourth switch T2b disposed between the fourth capacitor 159b and the controller 160. For example, the fourth switch T2b may be a transistor. In particular, a base end of the fourth switch T2b may be connected to the controller 160, a collector end thereof may be connected to the fourth capacitor 159b, and an emitter end thereof may be connected to the first end K4 of the second coil 157b. The filter unit 150d may be configured to selectively turn on a plurality of switches in response to a control command of the controller 160, and may be configured to eliminate noise generated during charging by allowing current to flow through the first and second coils through the turned-on switches.

The control or operation of the plurality of switches of the filter unit 150d as described above will be described in more detail below. The controller 160 may be configured to detect a temperature of the first coil 157a of the first filter d1 and a temperature of the second coil 157b of the second filter d2, respectively, and execute a turn-on or a turn-off operation of the plurality of switches based on the detected temperatures of the first and second coils 157a and 157b. The controller 160 may be configured to supply current to the transmission coil when a vehicle is in a charged state.

When charging of the vehicle starts, the controller 160 may be configured to turn-on of the first switch T1a and the third switch T2a, turn-off the second switch T1b and the fourth switch T2b, and adjust the current supplied to the first coil 157a and the second coil 157b, thereby eliminating noise generated during charging. During the turn-on control of the first switch T1a and the third switch T2a, the controller 160 may be configured to receive first temperature information corresponding to the temperature of the first coil from the first temperature detector S1a, and receive second temperature information corresponding to the temperature of the second coil from the third temperature detector S2a.

The controller 160 may be configured to execute switching of turn-on and turn-off operations of the plurality of switches based on at least one of the first temperature information and the second temperature information, and a reference temperature information. The controller 160 may be configured to determine whether the temperature of the first coil is greater than or equal to a reference temperature based on the first temperature information and the reference temperature information, turn-off of the first switch T1a and the third switch T2a in response to determining that the temperature of the first coil is equal to or greater than the reference temperature, turn-on of the second switch T1b and the fourth switch T2b, and adjust the current supplied to the first coil 157a and the second coil 157b, thereby eliminating noise generated during charging.

Additionally, the controller 160 may be configured to determine whether the temperature of the second coil is greater than or equal to the reference temperature based on the second temperature information and the reference temperature information, turn-off of the first switch T1a and the third switch T2a in response to determining that the temperature of the second coil is equal to or greater than the reference temperature, turn-on of the second switch T1b and the fourth switch T2b, and adjust the current supplied to the first coil 157a and the second coil 157b, thereby eliminating noise generated during charging.

During the turn-on control of the second switch T1b and the fourth switch T2b, the controller 160 may be configured to receive the first temperature information corresponding to the temperature of the first coil from the second temperature detector S1b, and receive the second temperature information corresponding to the temperature of the second coil from the fourth temperature detector S2b. The controller 160 may be configured to determine whether the temperature of the first coil is greater than or equal to the reference temperature based on the first temperature information and the reference temperature information, turn-on of the first switch T1a and the third switch T2a in response to determining that the temperature of the first coil is equal to or greater than the reference temperature, turn-off of the second switch T1b and the fourth switch T2b, and adjust the current supplied to the first coil 157a and the second coil 157b, thereby eliminating noise generated during charging.

The controller 160 may be configured to determine whether the temperature of the second coil is greater than or equal to the reference temperature based on the second temperature information and the reference temperature information, turn-on of the first switch T1a and the third switch T2a in response to determining that the temperature of the second coil is equal to or greater than the reference temperature, turn-off of the second switch T1b and the fourth switch T2b, and adjust the current supplied to the first coil 157a and the second coil 157b, thereby eliminating noise generated during charging.

As illustrated in FIG. 11, the controller 160, in a first mode, may be configured to turn-on the first switch T1a and the third switch T2a and turn-off the second switch T1b and the fourth switch T2b, and in a second mode, turn-off the first switch T1a and the third switch T2a and turn-on of the second switch T1b and the fourth switch T2b. In other words, in response to determining that the temperature of at least one coil is greater than or equal to the reference temperature, the controller 160 may be configured to prevent an increase in the temperature of the coil by executing the switching of the turn-on and turn-off operations of the plurality of switches to change a region of the coil through which current flows.

The controller 160 may be configured to execute switching between the first mode and the second mode at a preset time interval. In other words, the controller 160 may be configured to turn-on of the first switch and the third switch, turn-off the second switch and the fourth switch, turn-off the first switch and the third switch when a preset time has elapsed, and turn-on the second switch and the fourth switch.

As another exemplary embodiment, the filter unit may include the first switch disposed between the first coil and the controller, and the second switch disposed between the second coil and the controller. In particular, the controller may be configured to execute switching of turn-on of the first switch and the second switch at a preset time interval. In other words, the controller 160 may be configured to turn-on the first switch, turn-off of the second switch, turn-off the first switch when a preset time has elapsed, and turn-on the second switch.

As another exemplary embodiment, the filter unit may include the first switch and the first temperature detector disposed between the first coil and the controller, and the second switch and the second temperature detector disposed between the second coil and the controller. In particular, in response to determining that the temperature of the first coil detected by the first temperature detector is greater than or equal to the reference temperature, the controller may be configured to turn-on the second switch, and turn-off the first switch, and when the temperature of the second coil detected by the second temperature detector during the turn-on control of the second switch is greater than or equal to the reference temperature, the controller may be configured to turn-on the first switch and turn-off the second switch. Accordingly, the controller may prevent the temperature of the filter unit from increasing by controlling the heat dissipation of the coils.

When the first switch T1a and the third switch T2a are turned on and the second switch T1b and the fourth switch T2b are turned off, the filter unit 150d may cancel the magnetic field generated from the transmission coil using the entire first coil 157a, regulate the current flowing through the entire first coil 157a using the first capacitor 158a, cancel the magnetic field generated from the transmission coil using a part of the second coil 157b, and regulate the current flowing through the part of the second coil 157b using the third capacitor 159a, thereby eliminating noise generated during charging.

When the first switch T1a and the third switch T2a are turned off and the second switch T1b and the fourth switch T2b are turned on, the filter unit 150d may cancel the magnetic field generated from the transmission coil using a part of the first coil 157a, regulate the current flowing through the part of the first coil 157a using the second capacitor 158b, cancel the magnetic field generated from the transmission coil using the entire second coil 157b, and regulate the current flowing through the entire second coil 157b using the fourth capacitor 159b, thereby eliminating noise generated during charging.

As is apparent from the above, a wireless charger according to the disclosure may effectively shield electromagnetic waves generated from a coil by disposing a filter at a position adjacent to the coil. Further, the wireless charger according to the disclosure may improve charging efficiency by effectively shielding EMC noise caused by a fringing magnetic field when energy is transmitted from a transmission coil to a reception coil. Additionally, the wireless charger according to the disclosure may further improve the charging efficiency by effectively shielding electromagnetic waves generated from the coil. Accordingly, the wireless charger according to the disclosure and a vehicle equipped with the same may improve quality and marketability, increase user satisfaction, and secure product competitiveness.

What is claimed is:

1. A wireless charger, comprising:
a power source;
a transmission coil configured to generate an electromagnetic field when power is supplied from the power source to cause an electromagnetic induction phenomenon between a reception coil provided in an object requiring power and the transmission coil; and
a filter unit disposed on one side of the transmission coil to be disposed between the transmission coil and the reception coil and including a coil and at least two capacitors for eliminating noise generated between the transmission coil and the reception coil;
wherein the at least two capacitors includes a first capacitor connected to a first end and an intermediate point of the coil, and a second capacitor connected to the first end of the coil and a second end of the coil
wherein the filter unit further includes:
a first switch disposed between the first capacitor and the second end of the coil;
a second switch disposed between the second capacitor and the second end of the coil;
a first temperature detector disposed between the first end of the coil and the first capacitor to detect a temperature of the coil; and
a second temperature detector disposed between the second capacitor and the second switch to detect the temperature of the coil; and
wherein one of the first switch and the second switch is turned on;
a controller configured to:
identify the temperature of the coil detected by the first temperature detector based on the turn-on of the first switch; and
identify the temperature of the coil detected by the second temperature detector based on the turn-on of the second switch.

2. The wireless charger according to claim 1, further comprising
a main body having a seating portion on which the object requiring power is seated,
wherein the transmission coil is provided inside the main body, and the filter unit is provided inside the main body and is disposed between the seating portion and the transmission coil.

3. A wireless charger, comprising:
a power source;
a transmission coil configured to generate an electromagnetic field when power is supplied from the power source to cause an electromagnetic induction phenomenon between a reception coil provided in an object requiring power and the transmission coil; and
a filter unit disposed on one side of the transmission coil to be disposed between the transmission coil and the reception coil and including at least one coil and at least one capacitor for eliminating noise generated between the transmission coil and the reception coil;
wherein the filter unit includes:
a first filter having a first coil, a first capacitor connected to a first end and a second end of the first coil, and a second capacitor connected to an intermediate point of the first coil and the second end of the first coil;
a first switch disposed between the first capacitor and the second end of the first coil;
a second switch disposed between the second capacitor and the second end of the first coil;
a first temperature detector disposed between the first end of the first coil and the first capacitor to detect a temperature of the first coil; and
a second temperature detector disposed between the second capacitor and the second switch to detect the temperature of the first coil;
a second filter having a second coil, a third capacitor connected to a first end the second coil and an intermediate point of the second coil, and a fourth capacitor connected to the first end of the second coil and a second end of the second coil;
a third switch disposed between the first end of the second coil and the third capacitor;
a fourth switch disposed between the first end of the second coil and the fourth capacitor;
a third temperature detector disposed between the third capacitor and the third switch to detect a temperature of the second coil; and a fourth temperature detector disposed between the fourth capacitor and the second end of the second coil to detect the temperature of the second coil; and a controller configured to:
control one of the first switch and the second switch to turn on based on one of the temperature of the first coil detected by the first temperature detector or the temperature of the first coil detected by the second temperature detector; and control one of the third switch and the fourth switch to turn on based on one of the temperature of the second coil detected by the third temperature detector or the temperature of the second coil detected by the fourth temperature detector.

4. The wireless charger according to claim 3, wherein: the controller is further configured to, at turn-on control of the first switch and turn-off control of the second switch, turn off the first switch and turn on the second switch, in response to determining that the temperature of the first coil detected by the first temperature detector is greater than or equal to a reference temperature.

5. The wireless charger according to claim 3, wherein: the controller is further configured to, at turn-on control of the third switch and turn-off control of the fourth switch, turn off the third switch and turn on the fourth switch, in response to determining that the temperature of the second coil detected by the third temperature detector is greater than or equal to a reference temperature.

6. The wireless charger according to claim 5, wherein the controller is configured to, at turn-off control of the third switch and turn-on control of the fourth switch, turn on the third switch and turn off the fourth switch, in response to determining that the temperature of the second coil detected by the fourth temperature detector is greater than or equal to the reference temperature.

7. The wireless charger according to claim 3, wherein: the controller is further configured to perform a first mode of turning off the second switch and the fourth switch when turning on the first switch and the third switch, and a second mode of turning on the second switch and the fourth switch when turning off the first switch and the third switch.

8. The wireless charger according to claim 7, wherein: the controller is configured to execute switching between the first mode and the second mode based on at least one of the temperature of the first coil and the temperature of the second coil.

9. A wireless charger, which performs wireless charging in a reception coil and a transmission coil, comprising:
a first filter including a first coil, a first capacitor connected to a first end of the first coil and a second end of the first coil, a second capacitor connected to an intermediate point of the first coil and the second end of the first coil, a first switch disposed between the first capacitor and the second end of the first coil, and a second switch disposed between the second capacitor and the second end of the first coil;

a first temperature detector disposed between the first end of the first coil and the first capacitor to detect a temperature of the first coil;

a second temperature detector disposed between the second capacitor and the second switch to detect the temperature of the first coil;

a second filter including a second coil, a third capacitor connected to a first end of the second coil and an intermediate point of the second coil, a fourth capacitor connected to the first end of the second coil and a second end of the second coil, a third switch disposed between the first end of the second coil and the third capacitor, and a fourth switch disposed between the first end of the second coil and the fourth capacitor;

a third temperature detector disposed between the third capacitor and the third switch to detect a temperature of the second coil;

a fourth temperature detector disposed between the fourth capacitor and the second end of the second coil to detect the temperature of the second coil; and a controller configured to:
perform a first mode of turning off the second switch and the fourth switch when turning on the first switch and the third switch;

perform a second mode of turning on the second switch and the fourth switch when turning off the first switch and the third switch; and execute switching between the first mode and the second mode based on at least one of the temperature of the first coil and the temperature of the second coil.

10. The wireless charger according to claim 9, wherein the controller is configured to:
when performing the first mode, switch to the second mode in response to determining that the temperature of the first coil detected by the first temperature detector is greater than or equal to a reference temperature or the temperature of the second coil detected by the third temperature detector is greater than or equal to the reference temperature; and when performing the second mode, switch to the second mode in response to determining that the temperature of the first coil detected by the second temperature detector is greater than or equal to the reference temperature or the temperature of the second coil detected by the fourth temperature detector is greater than or equal to the reference temperature.

11. The wireless charger according to claim 9, wherein the controller is configured to execute switching between the first mode and the second mode at a preset time interval.

* * * * *